United States Patent
Heitzman

[15] 3,683,467
[45] Aug. 15, 1972

[54] STORAGE SYSTEM FOR MOLDED ARTICLES

[72] Inventor: Charles J. Heitzman, 1260 Laukahi St., Honolulu, Hawaii 96821

[22] Filed: March 25, 1970

[21] Appl. No.: 22,509

[52] U.S. Cl. .....................25/133, 214/16.4, 25/2, 25/150
[51] Int. Cl. ...............................................F27b 1/08
[58] Field of Search....25/150, 135, 133, 139, 142 G, 25/2, DIG. 4, 41 C, 41 K, 41 J; 214/16.4 R, 16.6, 310

[56] References Cited

UNITED STATES PATENTS

| | | | |
|---|---|---|---|
| 818,852 | 4/1906 | Reid | 214/16.6 X |
| 2,502,940 | 4/1950 | Gelbman | 25/133 |
| 2,624,470 | 1/1953 | Geist | 214/16.6 X |
| 3,151,754 | 10/1964 | Kemp, Jr. | 214/310 |
| 3,303,545 | 2/1967 | Heitzman | 25/41 J |

Primary Examiner—J. Spencer Overholser
Assistant Examiner—Dewalden W. Jones
Attorney—Wilbur Mechlin

[57] ABSTRACT

A storage system having for stored molded articles during curing a storage unit containing in opposite sides a pair of back-to-back compartments each presenting for holding a stack of molded articles on pallets in vertically spaced relation a plurality of vertically spaced rows of laterally spaced support arms. Each compartment is loadable and unloadable through the adjoining side of the unit without disturbing molded articles in the other compartment and, for steam curing, the unit is enclosed, with doors for the compartments. Each compartment is loadable and unloadable in any desired sequence by a forklift truck and a lifting device is provided on a run-out table of an associated molding machine for lifting an article on its pallet from the table so that it can be picked up by the truck.

8 Claims, 9 Drawing Figures

PATENTED AUG 15 1972
3,683,467
SHEET 1 OF 4
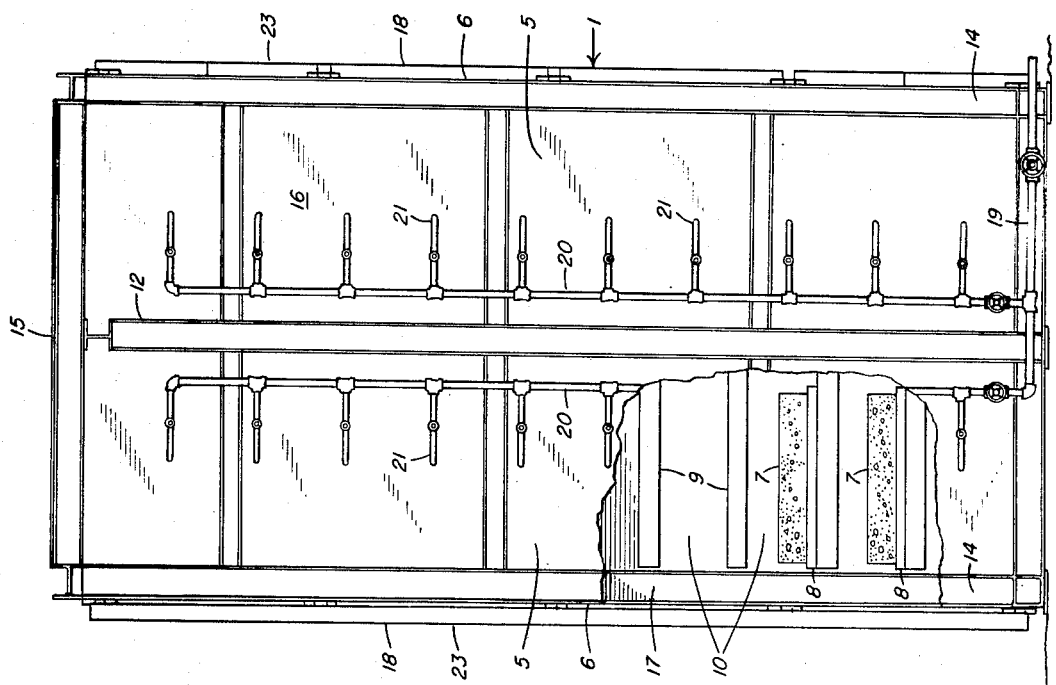
FIG. 1
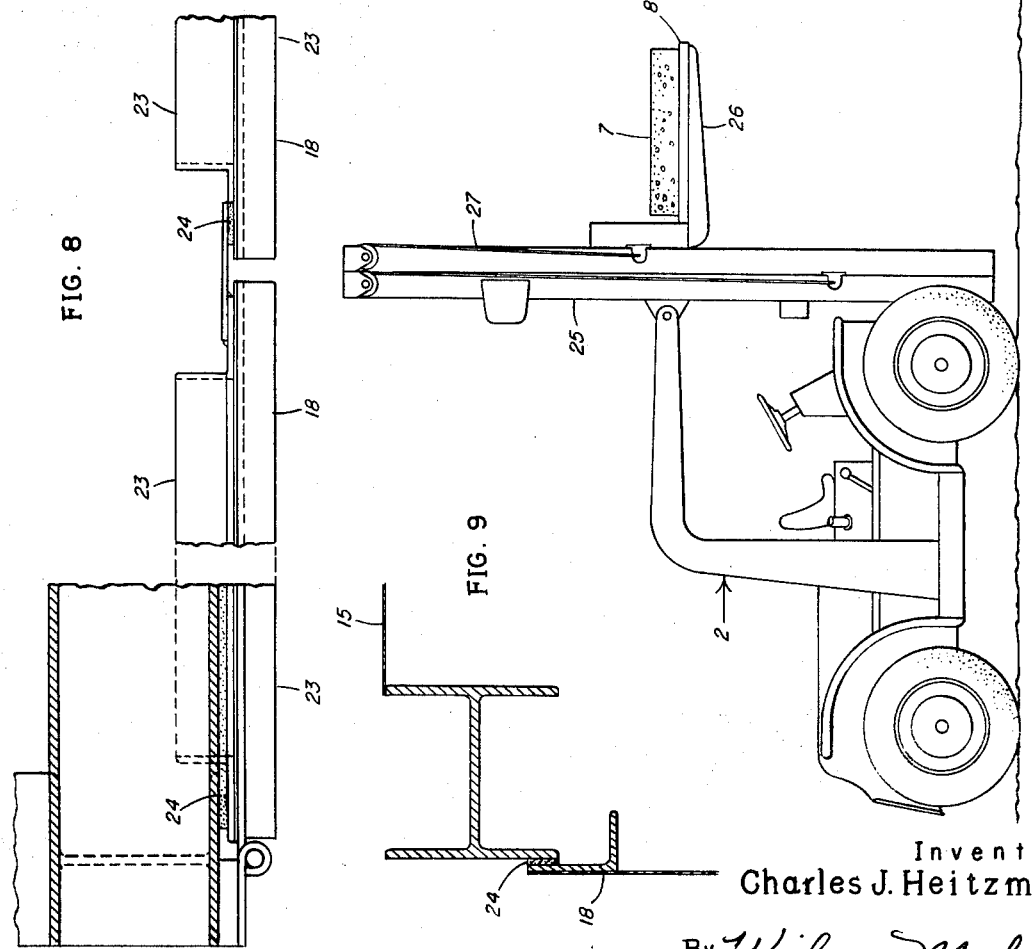
FIG. 8
FIG. 9
Inventor:
Charles J. Heitzman
By Wilmer Mechlin
his Attorney Inventor:
Charles J. Heitzman By Wilmer Mechlin
his Attorney

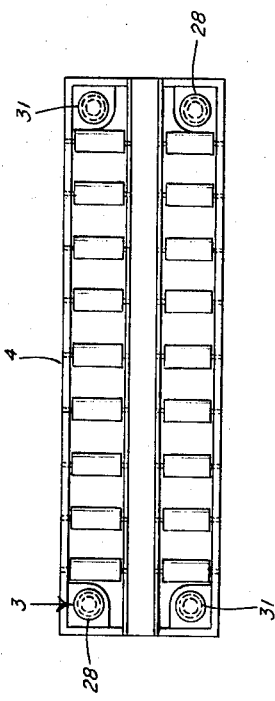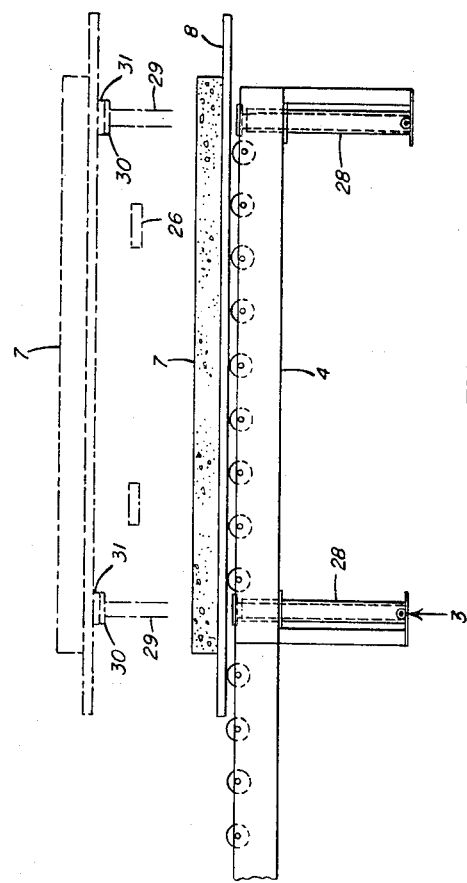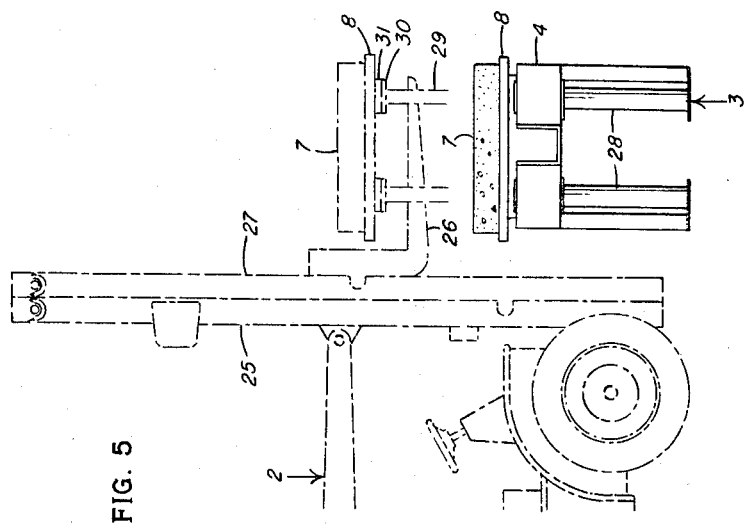
Inventor:
Charles J. Heitzman
By Wilmer Mecklin
his Attorney

STORAGE SYSTEM FOR MOLDED ARTICLES

BACKGROUND OF THE INVENTION

Articles molded of concrete or other self-hardening material require curing for a time after molding before they are sufficiently hardened to be handleable without any extraneous support. Numerous systems have heretofore been proposed for storing such molded articles during curing, some at a single level, but, to conserve space, more often at a plurality of levels in stacks. Generally, in systems of the stack type, articles on pallets are loaded into one side of a storage unit onto any of a plurality of vertically spaced racks and are moved along their racks for subsequent unloading from the opposite side. Depending on the material of which the articles are molded, systems of the stack type may have their storage units enclosed and fitted for applying steam to hasten the curing and usually are complex and correspondingly expensive structures with in-built loading and unloading devices. The present invention is concerned with a stack type storage system, which, while at least comparable in efficiency and capacity with prior systems, is simpler and less expensive in both structure and operation.

SUMMARY OF THE INVENTION

The primary object of the present invention is to provide an improved system for storing molded articles during curing, wherein molded articles on pallets are loaded into and unloaded from the same side of a storage unit onto any of a plurality of vertically spaced rows of laterally spaced arms in one of a pair of back-to-back compartments in opposite sides of the unit without disturbing articles in the other side.

Another object of the invention is to provide an improved system for storing molded articles during curing combining a storage unit of the character described with a separate mobile transporter-elevator for loading and unloading the compartments.

An additional object of the invention is to provide an improved system for storing molded articles during curing wherein the storage unit is enclosed and fitted for steam curing and has normally closed access openings at opposite sides, each for one of a pair of back-to-back compartments.

A further object of the invention is to provide an improved system for storing articles discharged on pallets from a molding machine, including in addition to a plural compartment storage unit and a mobile transporter-elevator for loading and unloading the unit, lifting means on the run-off table of the machine for facilitating picking up of each pallet and any molded article thereon.

Another object of the invention is to provide an improved system for storing molded articles during curing wherein each article is not only steam cured in one of a pair of back-to-back compartments in an enclosed storage unit, but the unit is partitioned between the compartments so that steam can be applied to each without affecting the other.

Other objects and advantages of the invention will appear hereinafter in the detailed description, be particularly pointed out in the appended claims and be illustrated in the accompanying drawings, in which:

FIGURE DESCRIPTION

FIG. 1 is a view showing in end elevation a storage unit and in side elevation a forklift truck of the preferred embodiment of the storage system of the present invention, with a portion of the unit broken away to more clearly illustrate certain details of construction;

FIG. 5 is an end elevational view of the preferred runout table of the improved storage system, showing in solid line a pallet-supported concrete panel resting on the table and in dot-and-dash line the panel about to be picked up by a forklift truck;

FIG. 6 is a fragmentary side elevational view of the table and panel of FIG. 5 with the truck removed;

FIG. 7 is a plan view of the table of FIGS. 5 and 6 with the panel and pallet removed;

FIG. 8 is a fragmentary vertical sectional view on an enlarged scale, taken along lines 8—8 of FIG. 2, and FIG. 9 is a fragmentary horizontal sectional view on the scale of FIG. 8, taken along lines 9—9 of FIG. 2.

DETAILED DESCRIPTION

Figure 2:
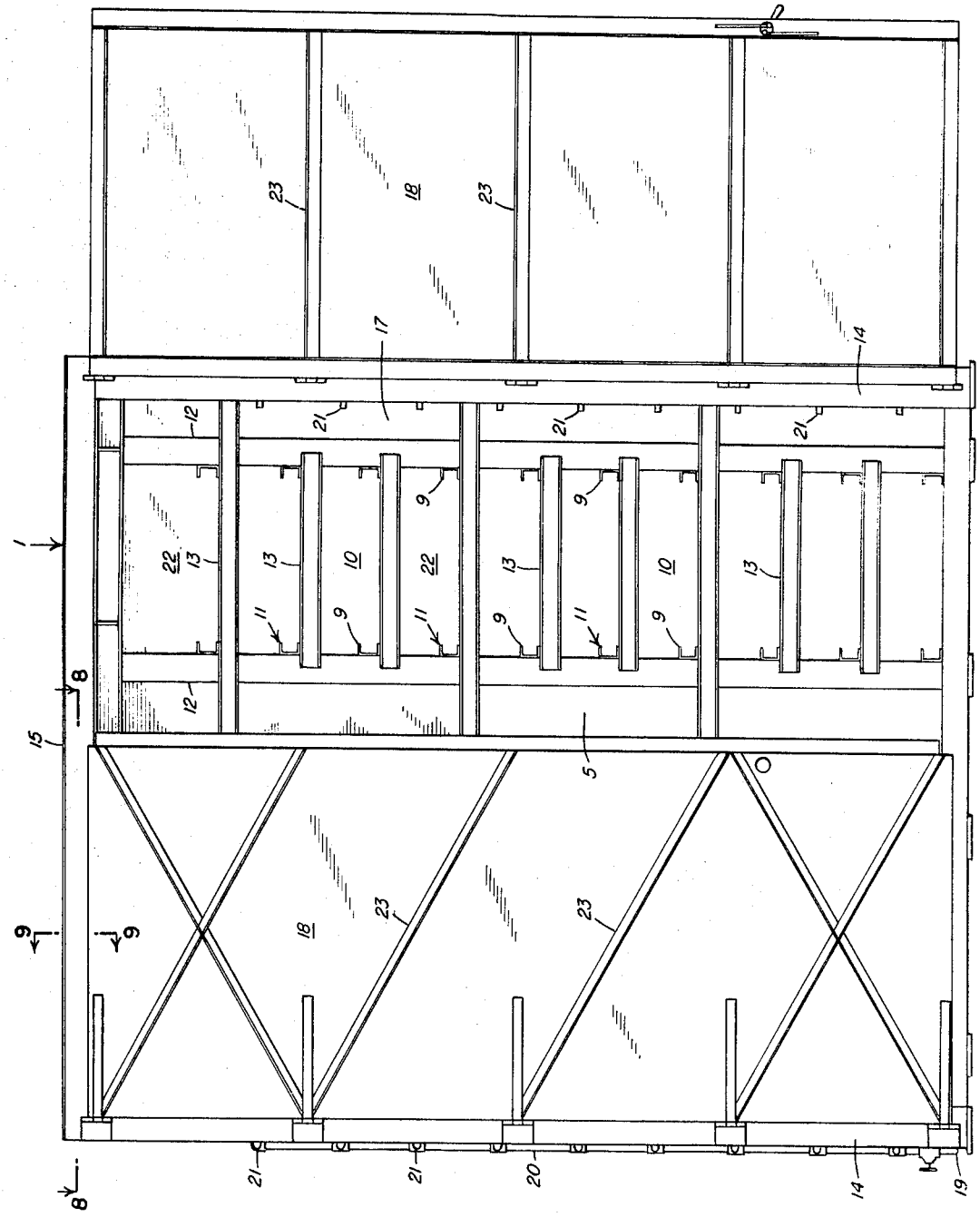
FIG. 2 is a side elevational view of the storage unit of FIG. 1 with one door open to show structural details of the adjoining compartment.
Figure 4:
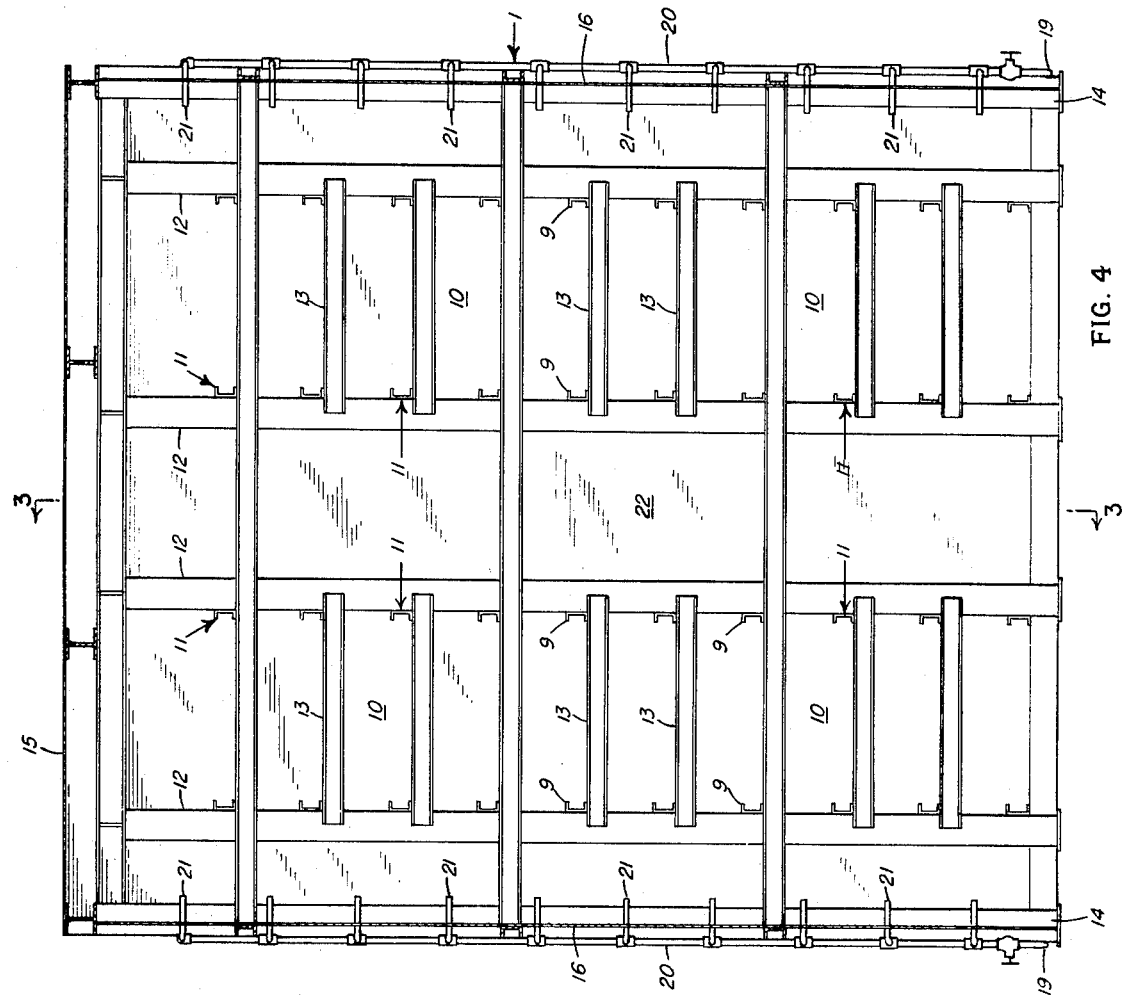
FIG. 4 is a longitudinal vertical sectional view taken along lines 4—4 of FIG. 3.
Figure 3:
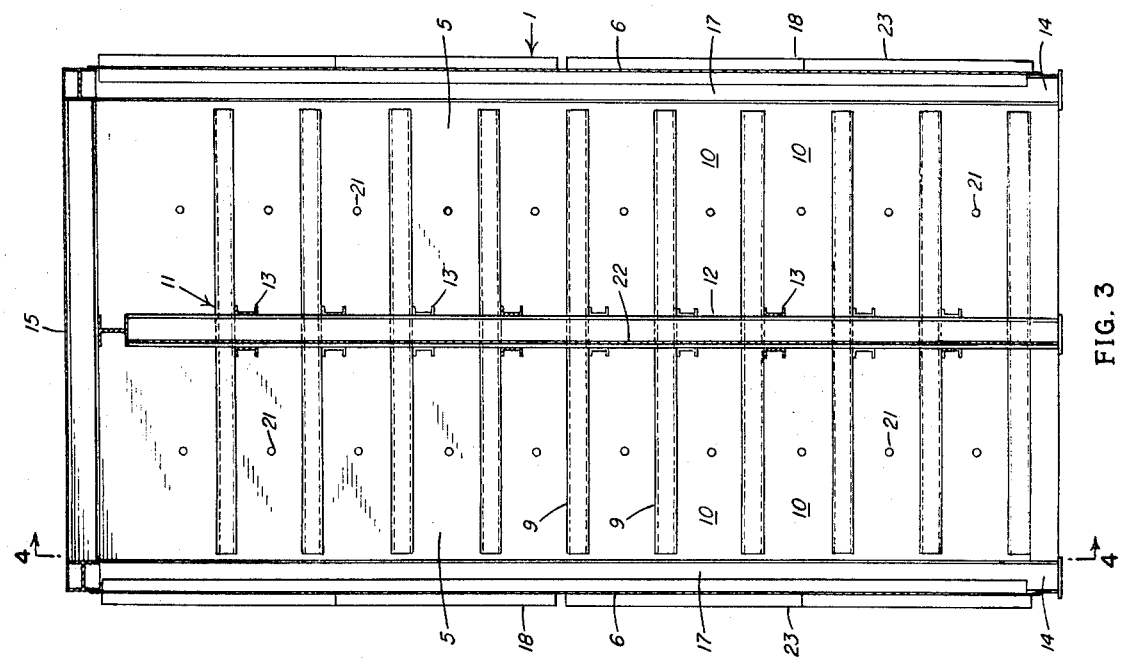
FIG. 3 is a transverse vertical sectional view of the storage unit with the access doors closed, taken along lines 3—3 of FIG. 4.

Referring now in detail to the drawings in which like reference characters designate like parts, the improved storage system of the present invention, while adapted to store on pallets articles molded of cement concrete (hereinafter termed "concrete") or other self-hardening material during curing thereof in ambient air, is particularly designed for use in steam curing panels or other articles machine-molded of concrete. As exemplary of the invention, the improved system thus has been illustrated in a form particularly suited for steam curing concrete building panels molded on a molding machine (not shown), such as shown in Heitzman U.S. Pat. No. 3,303,545, issued Feb. 14, 1967. or my copending application, Ser. No. 799,564, filed Feb. 17, 1969.

For storing during curing machine-molded concrete panels or other articles, the improved system is composed of three main components: one, a storage unit 1, another, a forklift truck or like suitable mobile transporter-elevator 2, and the third, a lifting device 3 incorporated in a run-out table or discharge conveyor 4 of a molding machine (not shown). Of these main components, the storage unit 1 contains or is divided into a pair of suitably identical or counterpart compartments 5 arranged back-to-back or in tandem and within and opening onto or facing the unit's opposite sides 6. Each of the compartments 5 is adapted to contain or hold stationarily during curing a batch or plurality of vertically stacked and spaced concrete panels or other molded articles 7 on rigid pallets 8, suitably those on which the illustrated panels are molded and discharged from the associated molding machine.

Within each compartment 5 the panels 7 on their pallets 8 are supported in horizontal disposition on vertically spaced rows or tiers of laterally spaced support arms or beams 9, in slots or spaces 10 between the rows. The capacity of each compartment 5 will depend on the number and size of the articles in the batch intended to be cured in a single curing operation and each slot may contain one or more articles on the same or separate pallets. However, as in the illustrated embodiment in which each slot 10 contains only one large panel 7 and its pallet 8, the slot should be of ample dimensions not only to accommodate the intended loading but also to prevent accidental scoring of any article during loading by the overlying row of support arms in its then relatively soft, uncured state.

In the preferred construction of the storage unit 1, the support arms 9 of each of the compartments 5 are the free ends of double cantilever transverse beams 11 common to the compartments and extending horizontally substantially the full width of the unit. Suitably channel irons, the transverse beams 11 are each welded or otherwise fixed at the center to and supported on one of a plurality of laterally spaced uprights, columns or posts 12. Disposed vertically in lateral alignment in a row centered laterally on the storage unit 1, the uprights 12 preferably are I-beams extending the height of the unit and, for more firmly supporting the illustrated large, heavy concrete panels 7, conveniently are arranged in pairs and cross-braced on both sides immediately below each row of the transverse beams 11, as by channel irons 13. With the cross-beams, cross-braces, or cross-bracing channel irons 13 at suitable levels extending the width of the storage unit across the uprights of both pairs and at intervening levels connecting only the uprights of one pair, the transverse beams 11 are not only fixed at their sides to the uprights but rest on the underlying pairs of cross-beams.

If, as preferred, the storage unit 1 is to be adapted for steam curing, the support structure formed by the uprights 12 and transverse and cross-beams 11 and 13, will be contained or enclosed, as by providing the storage unit beyond the support structure with corner posts 14, and a flat or other suitable roof 15 surmounting those posts and the uprights 12, and closing the ends of the unit between the corner posts by end sheets 16. So permanently closed at top and ends, the preferred storage unit has an access opening 17 in each side through which the adjoining compartment 5 is loaded and unloaded and these openings may be closed during steam curing by any suitable door or closure member 18, such as the pair of hinged doors used for closing each opening in the illustrated embodiment.

For applying or injecting steam into the compartments 5, the storage unit 1 may have at each end a valved steam inlet 19 supplying a pair of separately valved risers 20, one for each compartment, with an individually valved outlet 21 from each riser at the level of each of the panel-receiving slots 10. For fully independent operation, it is desirable to separate the compartments 5 by a sheet or like central partition 22 extending the full length and height of the interior of the storage unit and conveniently connected to and substantially centered laterally on the uprights 12. In the illustrated embodiment, the doors 18 of each pair overlap at the center, when closed, and are suitably reinforced by cross-ribbing 23 and escape of steam through the access openings 17 during curing is prevented by suitable gaskets 24, here conveniently mounted on the doors.

As stated earlier, in the improved system the compartments 5 of the storage unit 1 are loaded and unloaded by a forklift truck or other suitable mobile transporter-elevator 2. The preferred mobile transporter-elevator or loader-unloader 2 is a conventional forklift truck of sufficient load capacity and elevating range to carry or transport a concrete panel or other molded article 7 on its pallet 8 to and from the storage unit 1 and also load, place or deposit the molded article and its pallet on and unload or remove them from support arms 9 at any level in each of the compartments 5 and, within either compartment, in any desired sequence. For the extended lifting range required for loading and unloading the upper levels, the illustrated forklift truck 2, as usual, has a tiltable rear or main frame 25 and mounts its fork 26 for vertical shifting on a front frame 27 which is mounted for like shifting on the rear frame.

When the improved system is applied to the storing during curing of articles molded on a molding machine such as shown in the above-mentioned patent and application, the run-out table or discharge conveyor 4 of the machine should be of the illustrated roller type and of a length to accommodate a single pallet and a panel or other article or articles molded thereon as they are discharged at the end of a molding operation. However, a pallet resting on the table is not readily accessible to a forklift truck. Accordingly, in such an application, the improved system includes a lifting device 3 for lifting a pallet from the table to a level at which the fork 26 of the truck can be inserted without difficulty between the pallet and table. Incorporated or built into the table 4, the lifting device 3 includes a multiplicity of vertically acting, horizontally spaced, fluid-actuated, suitably hydraulic jacks 28 relatively positioned to provide multi-point support for a pallet and the molded article thereon. Suitably four in number and underlying or within the horizontal confines of the pallet 8 in the discharged position thereof, the hydraulic jacks have on the upper ends of their piston rods conveniently circular plates 30 preferably carrying or mounting rubber cushioning pads 31. Normally retracted below the level of an overlying pallet 8, the pads 31, on actuation of the jacks 28, engage the underside of the pallet and lift the latter and the molded article thereon to a height or level above the table where it is readily engageable by the fork 26 of the truck 2. As customary in a multiple jack installation, where the load must be maintained level during lifting, the lifting device has a set of flow dividers (not shown) in its fluid feed line (not shown) for ensuring uniform distribution of the fluid among the jacks.

While particularly designed for use with a molding machine adapted for continuous production of molded articles, the improved system, in storing articles during curing, involves essentially a batch curing operation in which the molded articles are cured in batches each of a size to fill or load one of the compartments 5. Depending on the capacity of the storage unit 1 and the time required for curing, the improved system in a given installation therefore may include one or more such units. However, since each storage unit will be operated in the same way, a description of the operation of one will suffice.

Assuming both of the compartments 5 initially to be empty, a concrete panel or other molded article 7, when discharged from the associated molding machine onto the run-out table 4 will be lifted from the table to a suitable higher level by actuation of the lifting device 3 and picked up and carried on the pallet by the forklift truck 2 to one of the compartments 5 of the storage unit 1, whose door or doors 18 will then be open. At the compartment the molded article, still on its pallet, will be loaded on a pair or, if sufficiently long, all of the support arms 9 at one of the levels. The truck then will shuttle back and forth between the run-out table and the compartment until the latter is filled or loaded, whereupon the truck will shift to the other compartment and similarly fill the latter. With the preferred support arms 9 of each compartment presenting free ends to the truck and also of a depth to accommodate the truck fork 26, the several levels or rows of arms in each compartment are loadable in any desired sequence.

If, for reducing the required curing time, the compartments 5 are separately fitted for steam curing and separated by the preferred central partition 22, the curing of batches of molded articles in the two compartments will be conducted independently. For each compartment, the preferred curing sequence will be to allow the molded articles of the batch to preset at ambient temperature for about 2 hours, usually with the doors 18 open, then close the doors and apply steam at a rate to build up the temperature in the compartment to about 150° F. at the rate of about 40° per hour. After some 4 hours of steaming in the 150° temperature range, the supply of steam to the compartment will be shut off and the doors opened. With another half hour allowed for cooling, the curing is completed and the molded articles, then self-sustaining, are unloaded from the compartments on their pallets in any desired sequence by the forklift truck 2. The pallets are then removed and returned to the molding machine for further use, while the molded articles, without their pallets, are moved to yard storage for subsequent shipping to customers. Immediately upon unloading, each compartment is ready for loading with another batch of molded articles and repetition of the curing cycle.

From the above detailed description it will be apparent that there has been provided an improved system for storing molded articles during curing, which with an inexpensive storage unit occupying a minimum of floor space and having no inbuilt loading and unloading devices, enables a plurality of batches of molded articles to be cured independently. It should be understood that the described and disclosed embodiment is merely exemplary of the invention and that all modifications are intended to be included that do not depart from the spirit of the invention and the scope of the appended claims.

Having described my invention, I claim:

1. A storage system for storing during curing molded articles of self-hardening material, comprising a storage unit containing back-to-back compartments opening into opposite sides of said unit and each loadable and unloadable through the same side, a plurality of vertically spaced rows of horizontally extending laterally spaced support arms in each compartment for supporting on each row during curing at least a pallet and a molded article supported thereon, said storage unit being enclosed except for access openings in opposite sides thereof through which said compartments are loaded and unloaded, door means for closing the access opening of each compartment during curing of molded articles therein, a central partition separating said compartments, and means for individually applying steam to said compartments.

2. A storage system according to claim 1, including mobile transporter-elevator means separate from the storage unit for individually loading and unloading each compartment without disturbing molded articles in the other compartment.

3. A storage system according to claim 1, wherein the storage unit includes a plurality of laterally spaced uprights aligned in a single row between the compartments, and horizontally extending members cross-bracing said uprights adjacent and underlying each row, and each support arm is a cantilever arm fixed to one of the posts and supported on adjoining of said cross-bracing members.

4. A storage system according to claim 1, wherein each support arm is one of the free ends of a double cantilever beam extending transversely of the storage unit and common to the compartments.

5. A storage system according to claim 2, wherein the transporter-elevator is a forklift truck.

6. A storage system according to claim 5, wherein the articles are machine-molded and after molding discharged on pallets onto a run-out table, and including lifting means connected to the table for lifting each pallet and a molded article thereon above the table for picking up by the truck.

7. A storage system according to claim 6, wherein the lifting means include a multiplicity of laterally spaced vertically acting fluid-actuated rams mounted on the table within horizontal confines of a pallet in the discharged position thereof and normally retracted below the level of said pallet.

8. A storage system according to claim 6, wherein the lifting means include a multiplicity of laterally spaced, vertically acting, fluid-actuated rams mounted on the table within horizontal confines of a pallet in the discharged position thereof and normally retracted below the level of said pallet.

* * * * *